United States Patent
Uemoto (10) Patent No.: US 7,834,940 B2
(45) Date of Patent: Nov. 16, 2010

(54) PHOTO SENSOR, DISPLAY PANEL HAVING THE SAME AND DISPLAY DEVICE HAVING THE DISPLAY PANEL

(75) Inventor: Tsutomu Uemoto, Seoul (KR)

(73) Assignee: Samsung Electronics Co., Ltd. (KR)

( * ) Notice: Subject to any disclaimer, the term of this patent is extended or adjusted under 35 U.S.C. 154(b) by 232 days.

(21) Appl. No.: 11/856,338

(22) Filed: Sep. 17, 2007

(65) Prior Publication Data

US 2008/0278665 A1    Nov. 13, 2008

(30) Foreign Application Priority Data

May 10, 2007    (KR) .................. 10-2007-0045339

(51) Int. Cl.
*G02F 1/13* (2006.01)
*G02F 1/135* (2006.01)
*G02F 1/1335* (2006.01)
*G01R 13/30* (2006.01)
*G01P 15/13* (2006.01)

(52) U.S. Cl. ................. 349/2; 349/24; 349/25; 349/27; 349/28; 349/106; 73/1.45; 73/1.56; 73/514.26

(58) Field of Classification Search .......... 349/106, 349/24–25, 27–28, 2; 345/88; 257/292, 257/462, E33.076, E33.077, E33.053, E33.069, 257/E31.115, E27.133, E27.141, E25.032
See application file for complete search history.

(56) References Cited

U.S. PATENT DOCUMENTS

| | | | | |
|---|---|---|---|---|
| 5,591,988 A | * | 1/1997 | Arai et al. | 257/59 |
| 6,023,307 A | * | 2/2000 | Park | 349/24 |
| 6,040,810 A | * | 3/2000 | Nishimura | 345/87 |
| 7,323,718 B2 | * | 1/2008 | Chen et al. | 257/72 |
| 2006/0124828 A1 | * | 6/2006 | Shin | 250/205 |
| 2006/0202947 A1 | * | 9/2006 | Lee | 345/102 |

FOREIGN PATENT DOCUMENTS

| | | |
|---|---|---|
| JP | 2006030889 | 2/2006 |
| JP | 2006091235 | 4/2006 |
| KR | 1020060101011 | 9/2006 |
| KR | KO 2006129877 | * 12/2006 |
| KR | 1020070002280 | 1/2007 |

* cited by examiner

*Primary Examiner*—Hoan C Nguyen
(74) *Attorney, Agent, or Firm*—Cantor Colburn LLP (57) ABSTRACT

A display device that includes a first substrate having pixel electrodes; a second substrate having a color filter corresponding to the pixel electrodes to display images; a photo switching element disposed at the first substrate; a red or green color filter corresponding to the photo switching element formed at the second substrate to sense an amount of external light; a driving controller configured to output a driving control signal responsive to the amount of external light sensed by the light sensing unit; and a light generation unit configured to provide the display unit with an internal light controlled by the driving control signal. This photo sensor is well suited to human-eye luminosity and uses external light to determine how much backlight is needed.

16 Claims, 11 Drawing Sheets

RELATIVE LUMINOSITY OF HUMAN EYE

LIGHT ABSORPTANCE ACCORDING
TO THE THICKNESS OF AN A-Si LAYER

PHOTO SENSOR, DISPLAY PANEL HAVING THE SAME AND DISPLAY DEVICE HAVING THE DISPLAY PANEL

This application claims priority to Korean Patent Application No. 2007-0045339, filed on May, 10th, 2007, and all the benefits accruing therefrom under 35 U.S.C §119, and the contents of which in its entirety are herein incorporated by reference.

BACKGROUND OF THE INVENTION

1. Field of the Invention

The present invention relates to a photo sensor, a display panel having the same and a display device having a display panel.

2. Description of the Related Art

Generally, a liquid crystal display device is classified as either a transmissive type liquid crystal display device, which displays images using an internal light source such as a backlight assembly, or a transmissive and reflective type liquid crystal display device which displays images using an internal light source or by reflecting an external incident light.

The transmissive and reflective type display device controls power supplied to a backlight assembly in response to an intensity of the external incident light. Specifically, when the external incident light has a lower intensity, the transmissive and reflective type display device operates in a transmission mode such that the backlight assembly is turned on and internal light transmitted by the backlight assembly is used to display images. When the external incident light has a higher intensity, the transmissive and reflective type display device operates in a reflective mode such that the backlight assembly is turned off and the external incident light is reflected to display images. Additionally, a gamma level is automatically adjusted corresponding to either the transmission mode or the reflective mode so that an image displaying quality is improved.

Thus, power consumption of the transmissive and reflective type display device is reduced by controlling the power supplied to the backlight assembly in response to the intensity of the external incident light. Additionally, when the gamma level is adjusted according to a respective operational mode of the liquid crystal display device, the image displaying quality is improved. Accordingly, a photo sensor disposed on a display panel of the liquid crystal display device to sense the intensity of the external incident light is required to reduce the power consumption of the liquid crystal display device.

SUMMARY OF THE INVENTION

Accordingly, the present invention is provided to substantially obviate one or more problems due to limitations and disadvantages of the related art. Exemplary embodiments of the present invention provide a photo sensor suited to human eye luminosity.

In an exemplary embodiment of the present invention, a photo sensor having a photo switching element is disposed at a first substrate, and a red color filter or a green color filter corresponding to a channel of the photo switching element is disposed at a second substrate facing the first substrate. In the present invention it is recognized that having photo switching elements corresponding to a red or green color filter is well suited to human eye luminosity.

The channel of the photo switching element includes an amorphous silicon layer and the thickness of the amorphous silicon layer is 500-2000 Å. The photo sensor further includes a liquid crystal layer disposed between the first substrate and the second substrate. The liquid crystal layer is used for a normally black mode display.

Exemplary embodiments of the present invention also provide a display panel having the above photo sensor. In some exemplary embodiments of the present invention, the display panel includes an array substrate, a liquid crystal layer and an opposing substrate. The array substrate has a first switching element in the active area and a second switching element in the sensing area. The opposing substrate is combined with the array substrate to receive the liquid crystal layer and the opposing substrate has a red or green color filter corresponding to the second switching element. The array substrate further has a storage capacitor applying a voltage to the second switching element. The red, green and blue color filters corresponding to the active area are formed on the opposing substrate. The opposing substrate further includes a transparent pattern.

Exemplary embodiments of the present invention also provide a display device having the above display panel. In some exemplary embodiments of the present invention, the display device includes a display unit, a photo sensing unit, a driving controller and a light generation unit. The display unit has pixel electrodes formed at a first substrate and a color filter disposed at a second substrate corresponding to the pixel electrodes. The photo sensing unit includes a photo switching element disposed at the first substrate and a red or a green color filter corresponding to the photo switching element formed at the second substrate to sense an amount of external light. The driving controller outputs a driving control signal responsive to the amount of external light sensed by the light sensing unit. The light generation unit provides the display unit with an internal light controlled by the driving control signal.

Exemplary embodiments of the present invention also provide a method of manufacturing a display device having the above photo sensor. In some exemplary embodiments of the invention, the method comprises forming pixel electrodes on a first substrate, forming a color filter corresponding to the pixel electrodes on a second substrate, positioning a photo switching element on the first substrate and positioning a red or green color filter on the second substrate corresponding to the photo switching element. The photo switching element comprises an amorphous silicon layer of which thickness is 500-2000 Å. Forming a blue color filter and a light blocking layer on the second substrate, disposing a liquid crystal for a normally black mode between the first substrate and the second substrate and disposing a light blocking layer opposite to the blue color filter may be further comprised.

BRIEF DESCRIPTION OF THE DRAWINGS

The present invention will become more apparent to those of ordinary skill in the art by describing, in detail, exemplary embodiments thereof with reference to the attached drawings, wherein like elements are represented by like reference numerals, which are given by way of illustration only and thus do not limit the exemplary embodiments of the present invention.

DETAILED DESCRIPTION OF THE INVENTION

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be oriented differently (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 1:
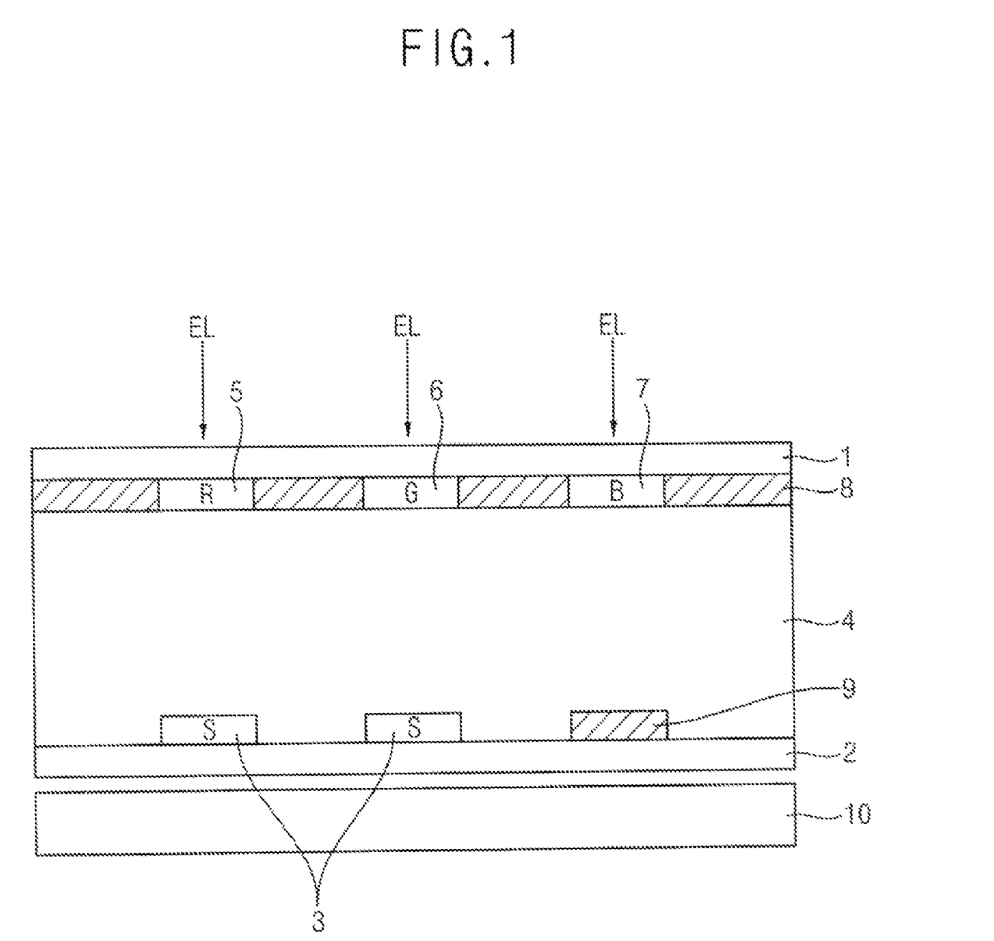
FIG. 1 is a schematic figure illustrating a photo sensor according to an exemplary embodiment of the present invention.

FIG. 1 is a schematic figure illustrating a photo sensor according to an exemplary embodiment of the present invention.

Referring to FIG. 1, a photo sensor is disposed on a first substrate 2 and Red, Green and Blue color filters 5, 6 and 7 are formed on a second substrate 1 facing the first substrate 2. A liquid crystal layer 4 is disposed between the first and second substrates 2 and 1. A back Light Unit 10 is disposed below the first substrate 2.

The photo sensors are disposed opposite to the red or green color filters 5, 6. But in this embodiment of the invention, no photo sensor is disposed opposite to the blue color filter since the human eye is not as sensitive to light in the blue range as discussed in relation to FIGS. 2 and 3 below.

A light blocking material or opaque material 9 is formed opposite to the blue color filters to block light from the back light unit 10. The photo sensor may have an amorphous silicon layer of which resistance can be changed according to the intensity of light.

External light (EL) through the red or green color filters is introduced to the photo sensors. The amount of current flowing through the photo sensor is varied in response to the intensity of the external light introduced to the photo sensor. So, The photo sensors make a signal according to the intensity of the external light.

A light blocking layer 8 is disposed at the second substrate 1. The light blocking layer 8 is used to block unnecessary light from the back light unit 10 below the first substrate 2.

Figure 2:
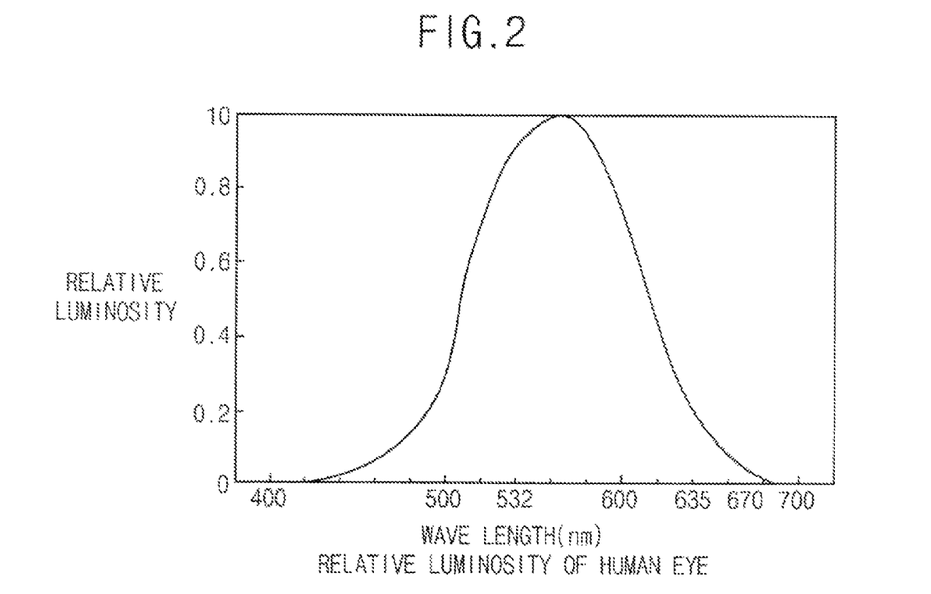
FIG. 2 is a graph of relative luminosity efficiency of a human eye.

FIG. 2 is a graph of relative luminosity efficiency of a human eye. The X axis is the wave length of light, and the y axis is relative luminosity efficiency. As the wave length of the light is increased, the relative luminosity efficiency of a human eye is increased and goes to a peak and then decreases. FIG. 2 shows that a human eye can easily recognize visible light from about 500 nm to about 630 nm which has the relative luminosity efficiency larger than 0.2.

Moreover, the light whose wave length is smaller than 420 nm and larger than 670 nm cannot be recognized by a human eye. The external light whose wave length is smaller than 420 nm and larger than 670 nm of the external light cannot be recognized by the human eye, so this external light does not need to be sensed by the photo sensor. Although that range of light is sensed by the photo sensor, it is not suitable for the human eye and therefore the user cannot detect a difference in display quality at those wavelengths.

For example, if an ultraviolet rich light (<500 nm) is introduced to the photo sensor, it is not recognized by the human eye (the relative luminosity efficiency<0.2). When light at these wavelengths is introduced to the photo sensor, and if the photo sensor reacts to the all the introduced light, the photo induced current will flow and the backlight of the device will decrease. The quality of the display will therefore decrease giving degraded display output.

Similarly, an infrared rich light (>635 nm) will have the same effects as outlined above.

Figure 3:
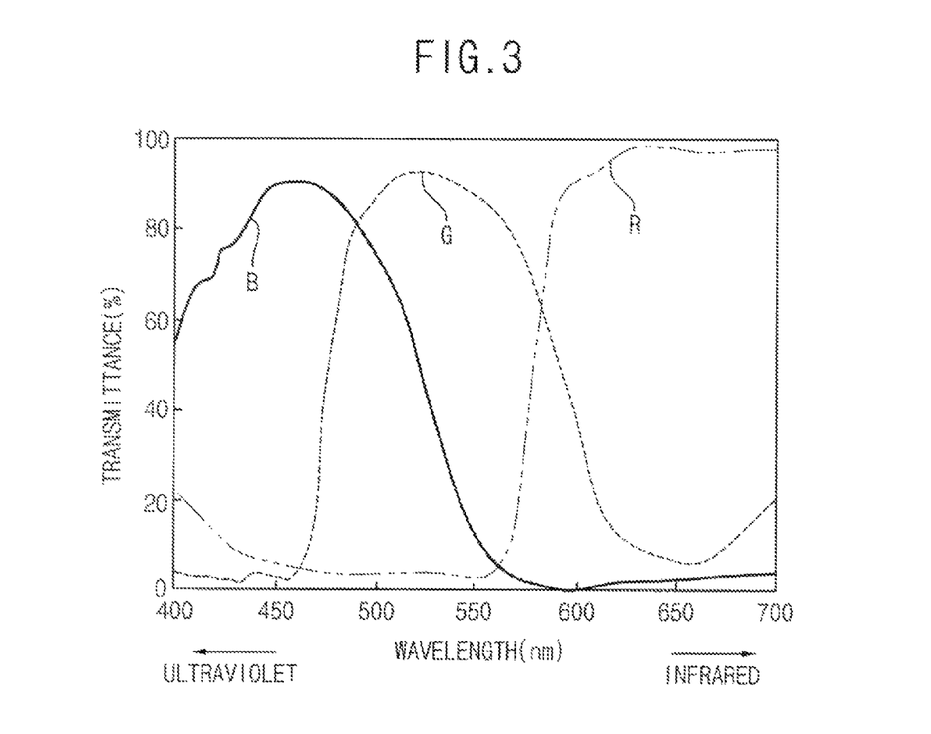
FIG. 3 is a spectrum of a color filter substrate.

FIG. 3 is a spectrum of a color filter substrate. The spectrum of the color filter substrate shows a transmittance of the color filter substrate according to the wave length of the light. In FIG. 3, when light having a wavelength of 400~500 nm is introduced to the color filter, the transmittance of the blue color filter is higher than that of the red or green color filter. When light having a wavelength of 500~600 nm light is introduced to the color filter, the transmittance of the green color filter is higher than that of the red or blue color filter. When light having a wave length of 600~700 nm light is introduced to the color filter, the transmittance of the red color filter is higher than that of the green or blue color filter.

Comparing FIG. 2 with FIG. 3, light having a wavelength of 500~630 nm, which is well recognized by human eye, has a high transmittance, over 80%, when it is introduced through the red color filter or green color filter. Light having a high transmittance introduced through the blue color filter is closer to the ultra-violet ray wavelength (~500 nm), which is rarely recognized by human eyes.

This suggests that the light introduced to the photo sensor through the blue color filter may include a light not recognized by human eyes. So, the photo sensor should preclude the blue color filter. In other words, when ultra-violet rich external light is introduced to the device, the photo sensor should not react to this kind of light. From FIG. 2 and FIG. 3, it is recommended in one embodiment of the invention to eliminate photo sensors corresponding to the blue color filter in order for the device to have luminosity suitable to the human eye. In other embodiments of the invention it may be important to limit the effect of the light from the blue color filters.

Referring to the FIG. 2 and FIG. 3, light having a wavelength over 630 nm which is closer to the infrared ray, is not recognizable to the human eye. This suggests that precluding the light over 630 nm introduced through red color filter to the photo sensor is recommended for making a device suitable to luminosity suitable to the human eye. If light over 630 nm is introduced to the photo sensor, and the photo sensor reacts to this light, then the photo induced current will flow in the device. Some of the signal will go to the driving circuit and the backlight current will be reduced creating a darker display panel. It may be difficult for the user to view the display under this condition. To solve this problem, the thickness of the amorphous silicon layer may be controlled.

Figure 4:
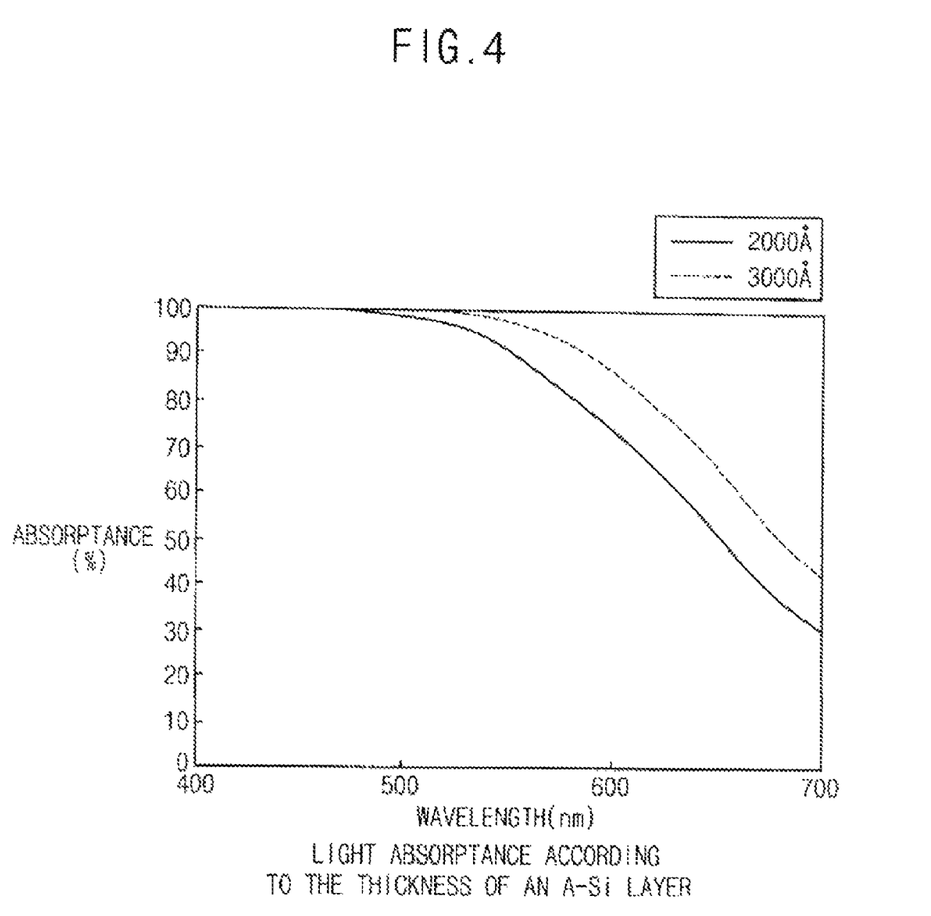
FIG. 4 is a graph of a light absorptance according to a thickness of an amorphous silicon layer.

FIG. 4 is a graph of a light absorptance according to the thickness of the amorphous silicon layer.

Referring to FIG. 4, the solid line is the absorptance when the thickness of the amorphous silicon layer is 2000 Å and the dotted line is the absorptance when the thickness of the amorphous silicon layer is 3000 Å. As the wave length is increased, the light absorption is apt to decrease. The absorptance when the thickness of amorphous silicon layer is 2000 Å is lower than the absorptance when the thickness of a-Si is 3000 Å. This means that the absorptance is lower as the amorphous silicon layer is thinner. The longer wave length is less absorbed into the a-Si layer and increases the penetration of the amorphous silicon layer.

To lower the absorptance of the light which is unrecognized to the human eyes, (i.e. light over 630 nm which is introduced through the red color filter), the thickness of the amorphous silicon layer should be thin. When the thickness is smaller, the current that flows into the photo sensor decreases. By controlling the thickness of the amorphous silicon layer, absorptance and transmittance of light are also controlled.

Figure 5:
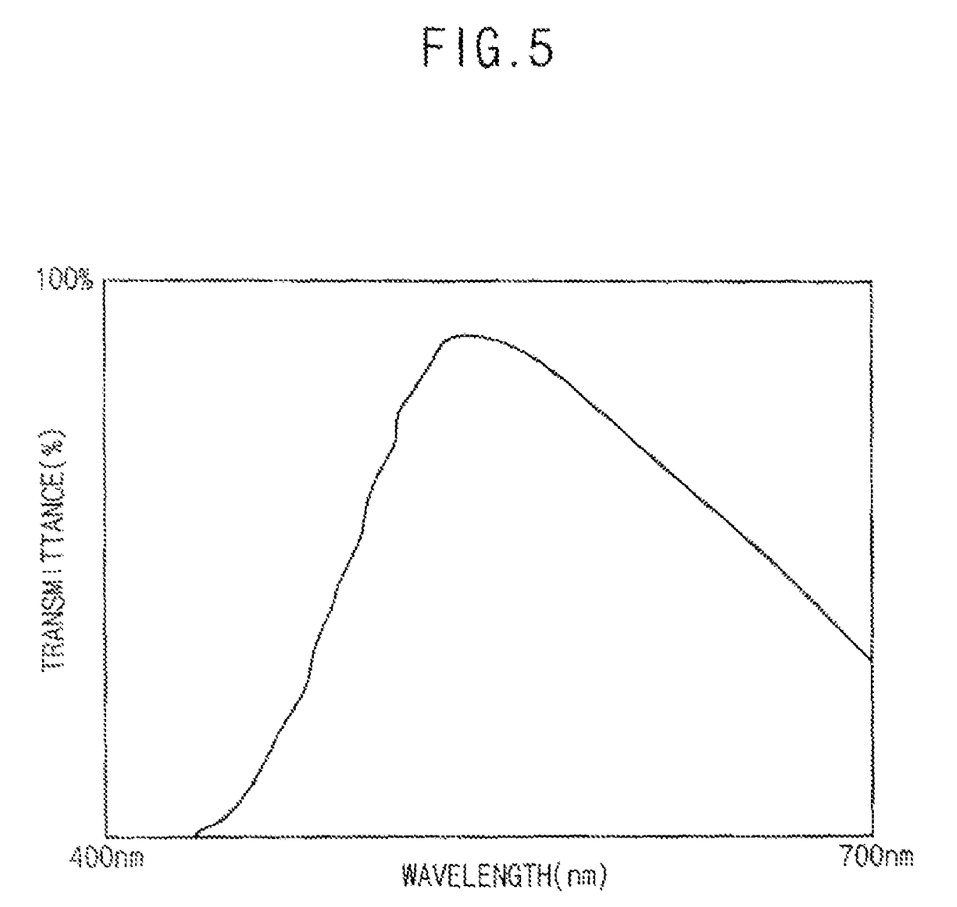
FIG. 5 is a spectrum of a photo sensor according to the exemplary embodiment of the present invention.

FIG. 5 is a spectrum of a photo sensor according to an exemplary embodiment of the present invention.

The thickness of the amorphous silicon layer of the photo switching device is about 500~2000 Å. A Red or Green color filter is disposed in the upper substrate corresponding to the photo switching device. In this condition, the spectrum of FIG. 5 is taken. This spectrum is very similar to the relative luminosity efficiency drawn in FIG. 2.

The photo sensor reacts to the light which is recognizable to the human eye.

Figure 6:
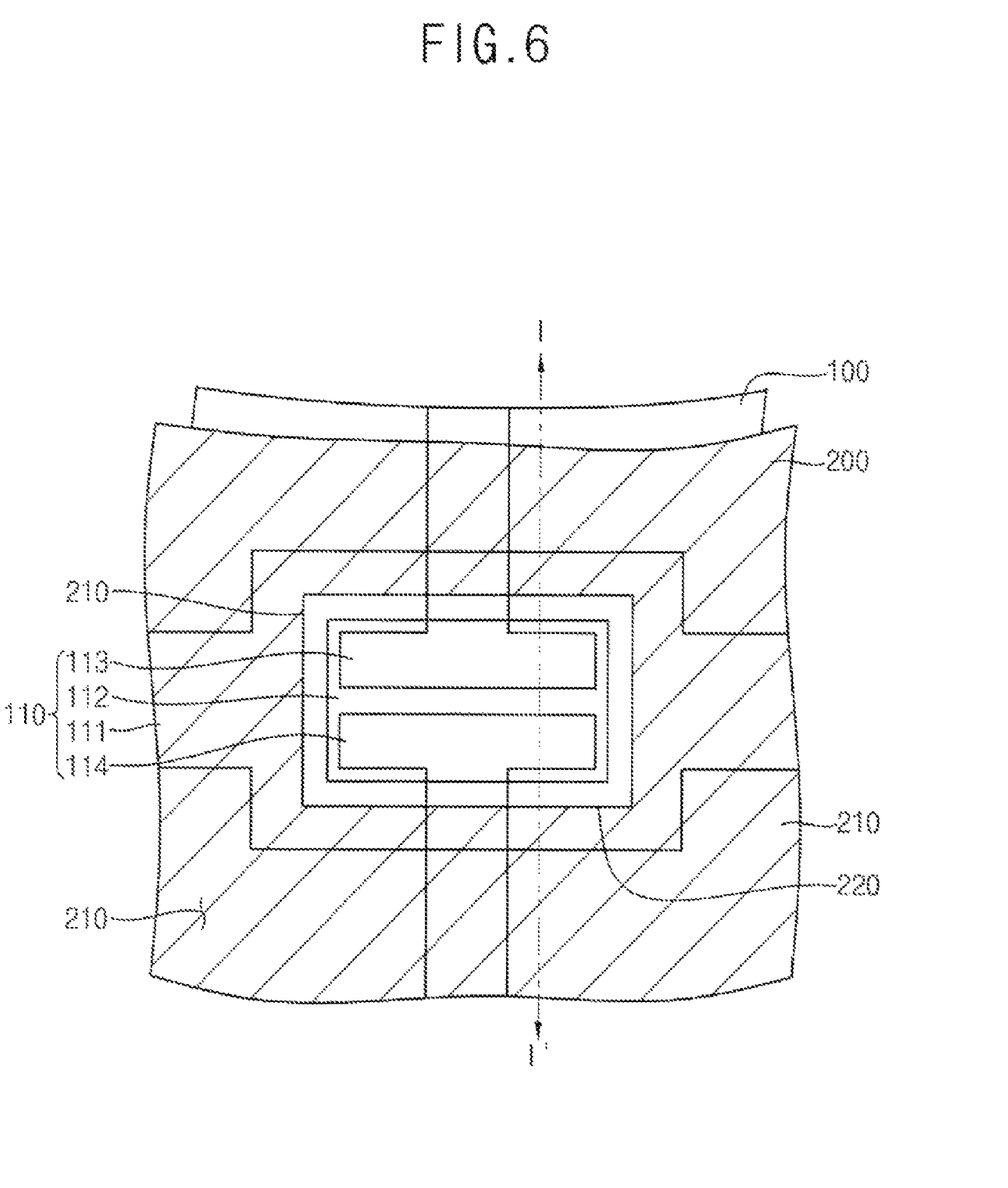
FIG. 6 is a plan view illustrating a photo sensor according to an exemplary embodiment of the present invention.

FIG. 6 is a plan view illustrating a photo sensor according to an exemplary embodiment of the present invention.

Figure 7:
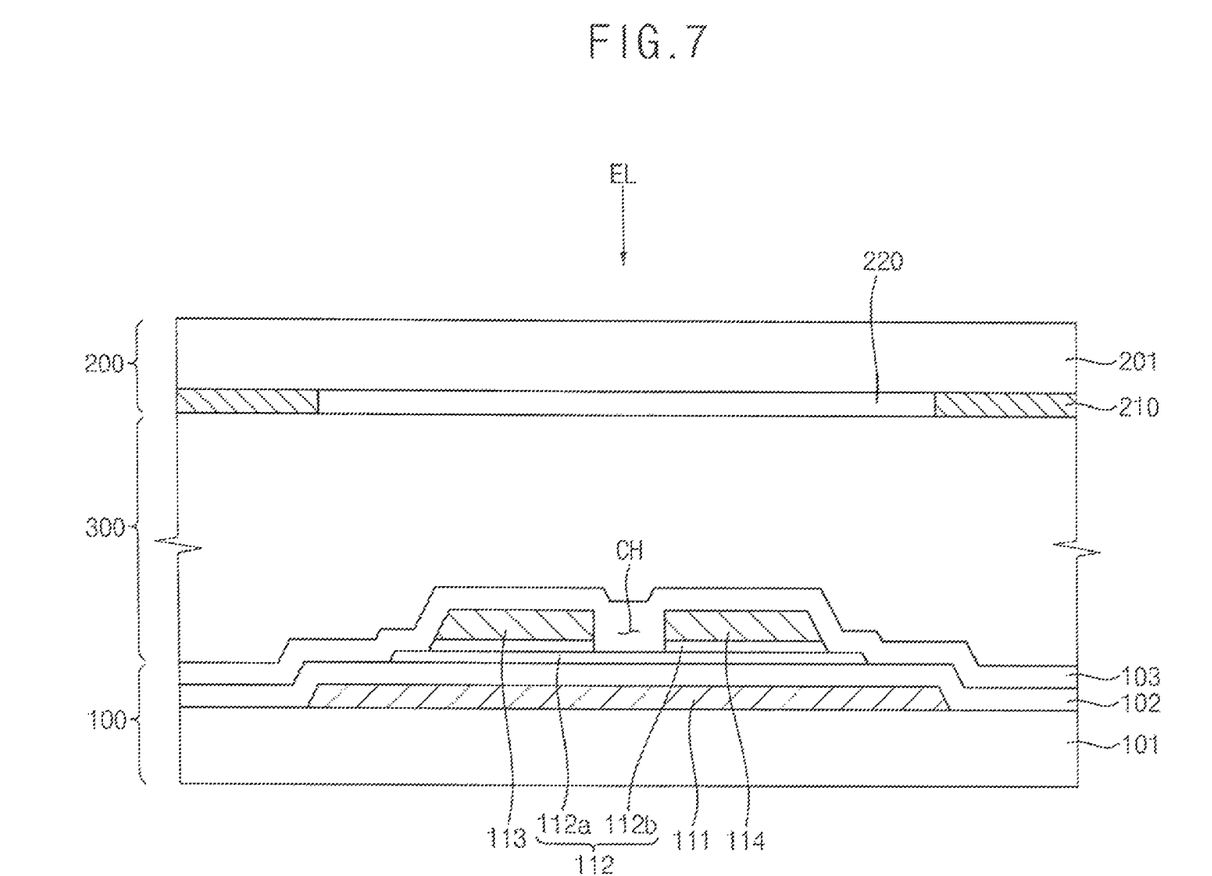
FIG. 7 is a cross sectional view taken along line I-I' in FIG. 6.

FIG. 7 is a cross sectional view taken along line I-I' in FIG. 6.

Referring to FIGS. 6 and 7, the photo sensor includes a photo switching element 110 formed on a first substrate 100 and a color filter 220 formed on a second substrate 200 facing the first substrate 100. A liquid crystal layer 300 is disposed between the first and second substrates 100 and 200. The liquid crystal layer may be in a normally black mode in which the display device displays a black image when a voltage is not supplied.

Particularly, the first substrate 100 includes a photo switching element (e.g., amorphous silicon thin film transistor (a-Si TFT)) 110 formed on a first base substrate 101. The photo switching element 110 includes an amorphous silicon layer for forming a channel.

The photo switching element 110 has a gate electrode 111 formed from a first metal layer, and source electrode 113 and a drain electrode 114 formed from a second metal layer. A semiconductor layer 112 is disposed between the gate electrode 111 and the source and drain electrodes 113 and 114. The semiconductor layer 112 includes an activation layer 112a and a resistive contact layer 112b.

A portion of the resistive contact layer 112b corresponding to the source and drain electrodes 113 and 114 is removed to form a channel (CH) in the semiconductor layer 112, and the activation layer 112a is exposed through the channel (CH). A resistance of the channel (CH) is varied in response to the amount of external light introduced to channel (CH), and accordingly the amount of current flowing through the channel (CH) is varied in response to the amount of the external light introduced to the channel (CH).

The semiconductor layer 112 is formed from an amorphous silicon layer, and the thickness of the semiconductor layer may be smaller than 2000 Å. Desirably it is 500~2000 Å.

A gate insulation layer 102 is disposed over the gate electrode 111 and a passivation layer 103 is disposed over the source and the drain electrodes 113 and 114, and exposed portions of the gate insulation layer 102.

The second substrate 200 includes a second base substrate 201, color filter layer 220 and a light blocking layer 210 disposed at the second base substrate 201. A dummy red color filter or a dummy green color filter is disposed at the second base substrate 201 facing the above photo switching element. The dummy color filter is larger than the semiconductor layer. The light blocking layer 210 is used to blocking the unnecessary light from the back light (not drawn) below the first substrate 100.

Figure 8:
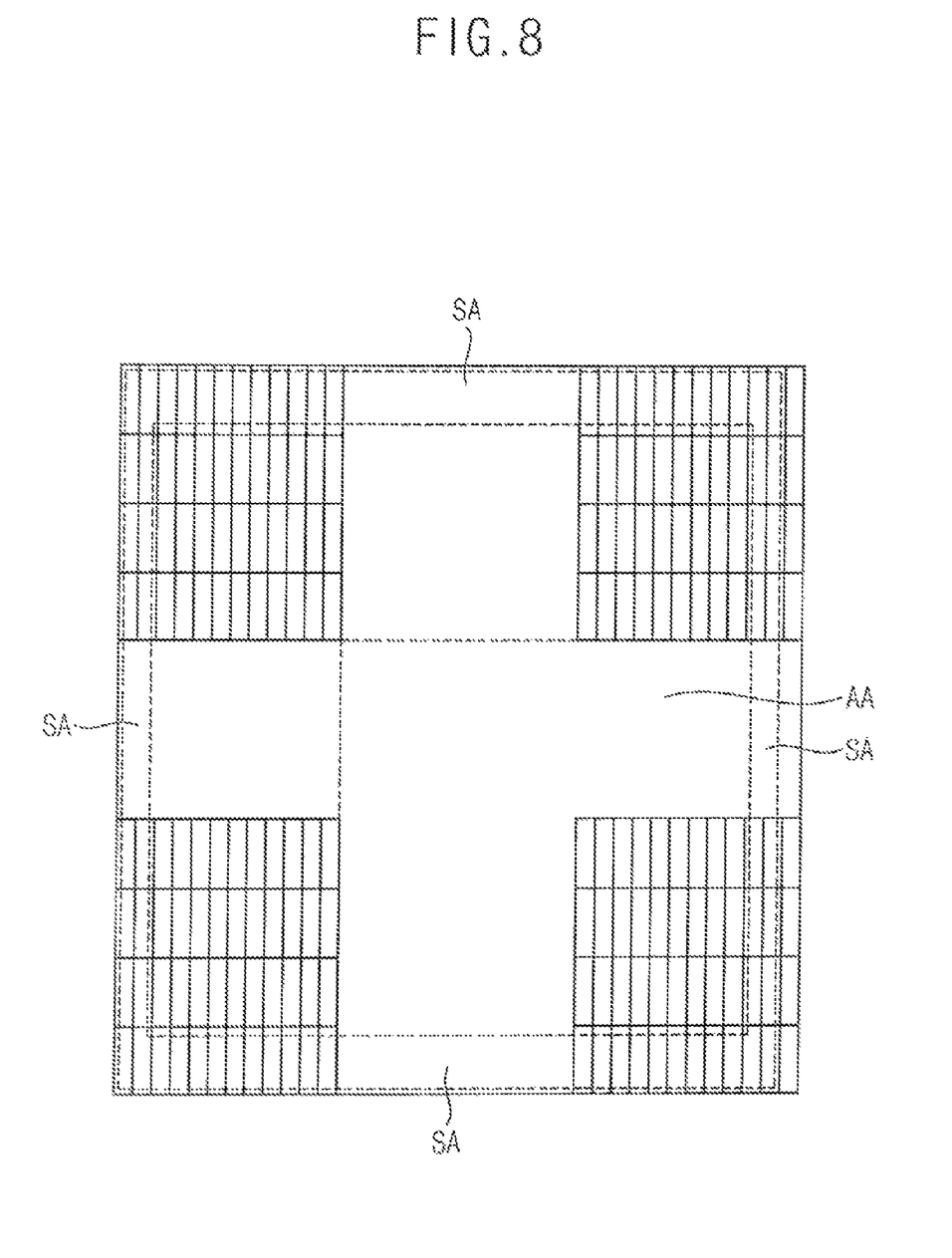
FIG. 8 is a plan view illustrating a display area and a photo-sensing area of the second substrate.

FIG. 8 is a plan view illustrating a display area and a photo-sensing area of the second substrate.

The second substrate has an AA (active area) and a SA (sensing area). The AA is an active area, which is a real display area, and the SA is a dummy area, which does not display images. At the SA, the external light is introduced to the photo sensor, so the device senses the amount of the external light.

The photo sensor is disposed under the SA area, especially under a dummy Red or Green color filter located near the SA area. The photo sensor is not disposed under the dummy blue filter. Under the blue filter, a metal opaque organic layer or light blocking layer is disposed on the first substrate in order to block light from the back light assembly and the external light.

In the FIG. 8, the photo sensor is disposed in the upper, lower, left and right side of the active area. The photo sensor may be disposed at least one part of the upper, lower, left and right side of the active area. For example, the photo sensor may be disposed in the left and right side of the active area, and the photo sensor may be at the upper and lower side of the active area.

Figure 9:
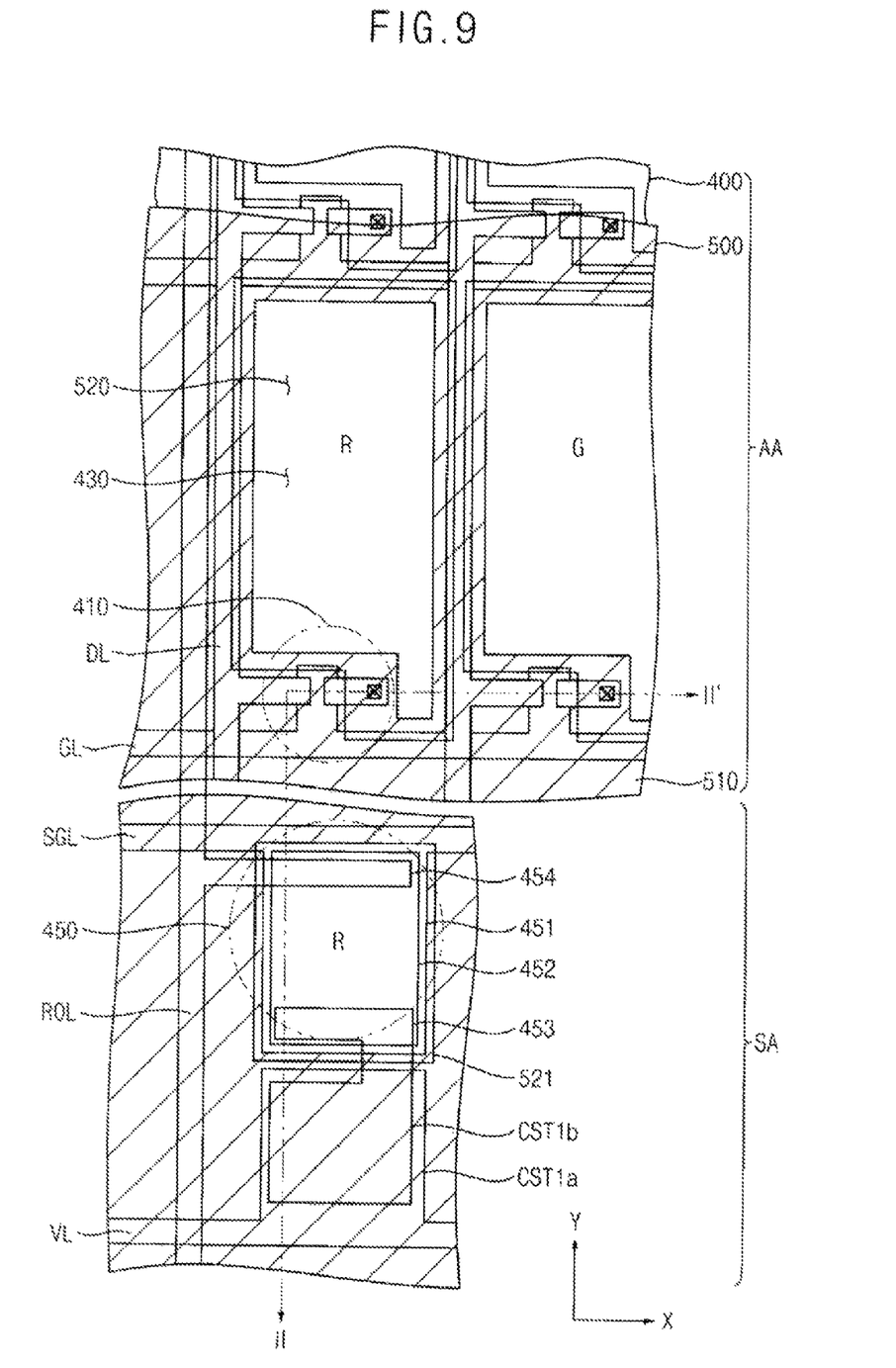
FIG. 9 is a plan view partially illustrating a display panel according to the exemplary embodiment of the present invention.
Figure 10:
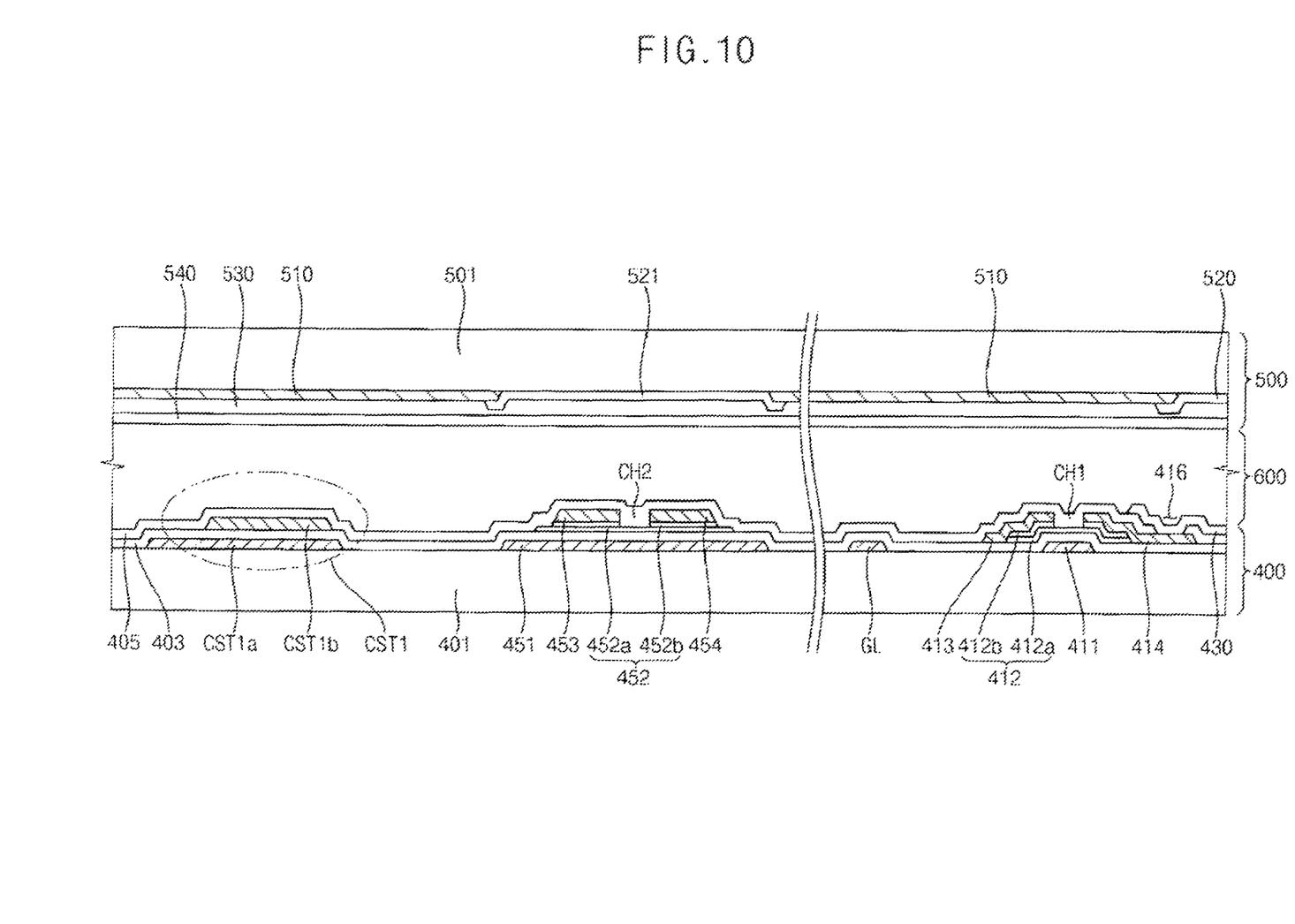
FIG. 10 is a cross sectional view taken along line II-II' in FIG. 8.

FIG. 9 is a plan view partially illustrating a display panel according to the exemplary embodiment of the present invention and FIG. 10 is a cross sectional view taken along line II-II' in FIG. 9.

Referring to FIGS. 9 and 10, the display panel includes an array substrate 400 and a color filter substrate 500.

The array substrate 400 includes an active area AA and a photo sensing area SA for sensing light. Data lines DL, gate lines GL, switching elements 410 coupled to the data lines DL and gate lines GL, and pixel electrodes 430 coupled to the respective switching elements 410 are disposed in the active area AA. A reflection portion having a reflection electrode can be further comprised in the active area AA.

Photo switching elements 450 coupled to the readout lines ROL and the sensing gate lines SGL are disposed in the sensing area SA. The sensing area can be disposed at the upper, lower, left or right side of the active area AA.

The color filter substrate 500 has a color filter 520 disposed in a first region corresponding to the active region AA and a dummy color filter 521 disposed in a second region corresponding to the sensing area SA.

A space for each unit pixel, which is filled with the color filter 520 and the dummy color filter 521, is defined by a light blocking layer 510. The color filter 520 includes respective color filters for red (R), green (G) and blue (B) colors to represent corresponding colors of incident light and the cooler filter 520 may further include cyan (C), magenta (M), yellow (Y), black (B) or transparent pattern. The dummy color filter layer 521 includes a color filter that cause a light having a wave length of 500 nm~630 nm, which is well recognized to human eyes. For example, Red or Green color filters are formed but Blue color filters, which are rarely recognizable to human eyes, are not formed in dummy color filter area.

Referring still to FIGS. 9 and 10, the display panel includes an array substrate 400, a color filter substrate 500 facing the array substrate 400 and a liquid crystal layer 600 disposed between the array substrate 400 and the color filter substrate 500.

The array substrate 400 includes a transparent substrate 401, the switching element 410, a pixel electrode 430 for a liquid crystal capacitor (CLC), a photo switching element 450 and a storage capacitor (CST1) for a photo switching element. A storage capacitor (not shown in the drawings) connected to the pixel electrode 430 may be further included.

The switching element 410 includes a first gate electrode 411, a first semiconductor layer 412, a first source electrode 413 and a first drain electrode 414. The first gate electrode 411 is disposed at the transparent substrate 401 and a gate insulation layer 403 is disposed over the first gate electrode 411. The first semiconductor layer 412 is disposed over the gate insulation layer 403 corresponding to the first gate electrode 411.

The first semiconductor layer 412 includes a first activation layer 412*a* and a first resistive contact layer 412*b* disposed on the first activation layer 412*a*. A portion of the first resistive contact layer 412*b* is removed between the source and drain electrodes 413 and 414 so that a channel (CH1) through which the activation layer 412*a* is exposed is formed in the first semiconductor layer 412. A passivation layer 405 is disposed at the first source and drain electrodes 413 and 414.

A portion of the passivation layer 405 disposed at the first drain electrode 414 is removed to form a contact hole 416. The pixel electrode 430 for a liquid crystal capacitor (CLC) is electrically coupled to the drain electrode 414 through the contact hole 416.

The photo switching element 450 includes a second gate electrode 451 (electrically connected to a sensing gate line SGL), a second semiconductor layer 452, a second source electrode 453 (electrically connected to a voltage line VL) and a second drain electrode 454. The second gate electrode 451 is disposed at the transparent substrate 401 and the gate insulation layer 403 is disposed over the second gate electrode 451. The second semiconductor layer 452 is disposed over the gate insulation layer 403 corresponding to the second gate electrode 451.

The second semiconductor layer (452) includes an amorphous silicon layer, and the thickness of the amorphous silicon layer is 500-2000 Å. The second semiconductor layer (452) is formed using the same process as used with the first semiconductor layer, and the thicknesses of the first semiconductor layer and the second semiconductor layer are different from each other. The first and second semiconductor layers are formed by a chemical vapor deposition method. The first semiconductor layer (412) in the active area (AA) has a thickness of 2000-4000 Å but the second semiconductor (452) in the photo sensing area (SA) has a thickness of 500-2000 Å.

The second semiconductor layer 452 includes a second activation layer 452*a* and a second resistive contact layer 452*b* disposed on the second activation layer 452*a*. A portion of the second resistive contact layer 452*b* is removed between the second source and drain electrodes 453 and 454 so that a second channel (CH2) is disposed at the first semiconductor layer 452. A passivation layer 405 is disposed over the second source and drain electrodes 453 and 454.

The sensing gate line (SGL) is extended in the horizontal direction (X), and supplies a sensing gate signal to the photo switching element (450) from the external circuit. The voltage line (VL) is extended in the vertical direction, and supplies a Von voltage from the external circuit to the photo switching element (450) through the storage capacitor (CS1). When the external light is introduced to the second channel (CH2) of the photo switching element (450), the photo induced current flows to the readout line (ROL) via the second source electrode (453). The photo induced current is a kind of photo sensing signal and includes information corresponding to the external light.

The readout line (ROL) is extended in the vertical direction (Y), and transfers the photo induced current of the photo switching element (450) to the external driver integrated chip (IC) (not drawn).

The storage capacitor (CST1) for the photo switching element is defined by a lower storage electrode (CST1a), which is formed when the voltage line (VL) is formed, and an upper storage electrode (CST1b) is formed when the second drain electrode (454) is formed.

The first and second gate electrodes 411 and 451, the first and second source and drain electrodes 413, 414, 453 and 454, the sensing gate line (SGL), voltage line (VL) and the readout line (ROL) may be formed as a single metal layer or a multi metal layer. The single or multi metal layer may include, for example, aluminum (Al), silver (Ag), copper (Cu), molybdenum (Mo), an alloy of aluminum, silver, copper or molybdenum, chromium (Cr), tantalum (Ta) or titanium (Ti), etc.

The color filter substrate 500 includes a transparent substrate 501, the light blocking layer 510, the color filter 520, the dummy color filter 521, a protective layer 530 and a common electrode layer 540.

Particularly, the light blocking layer 510 defines a space for each unit pixel corresponding to the pixel electrode 430.

The color filter 520 includes color filters for red, green and blue. A space for each unit pixel defined by the light blocking layer 510 is filled with the color filter 520. The color filter 520 may further include transparent pattern, cyan (C), magenta (M), yellow (Y) or black (B).

The protective layer 530 is disposed at the light blocking layer 510 and the color filter 520, and functions as a planarization film and a protective film. The common electrode layer 540 is a transparent conductive layer to which an electrode of the liquid crystal capacitor (CLC) is coupled. A common voltage is applied to the common electrode layer 540.

The dummy color filter 521 is disposed above the photo switching element 450. The size of the dummy color filter 521 may be larger than the size of the second channel 452 of the photo switching element 450 in the array substrate 400.

Figure 11:
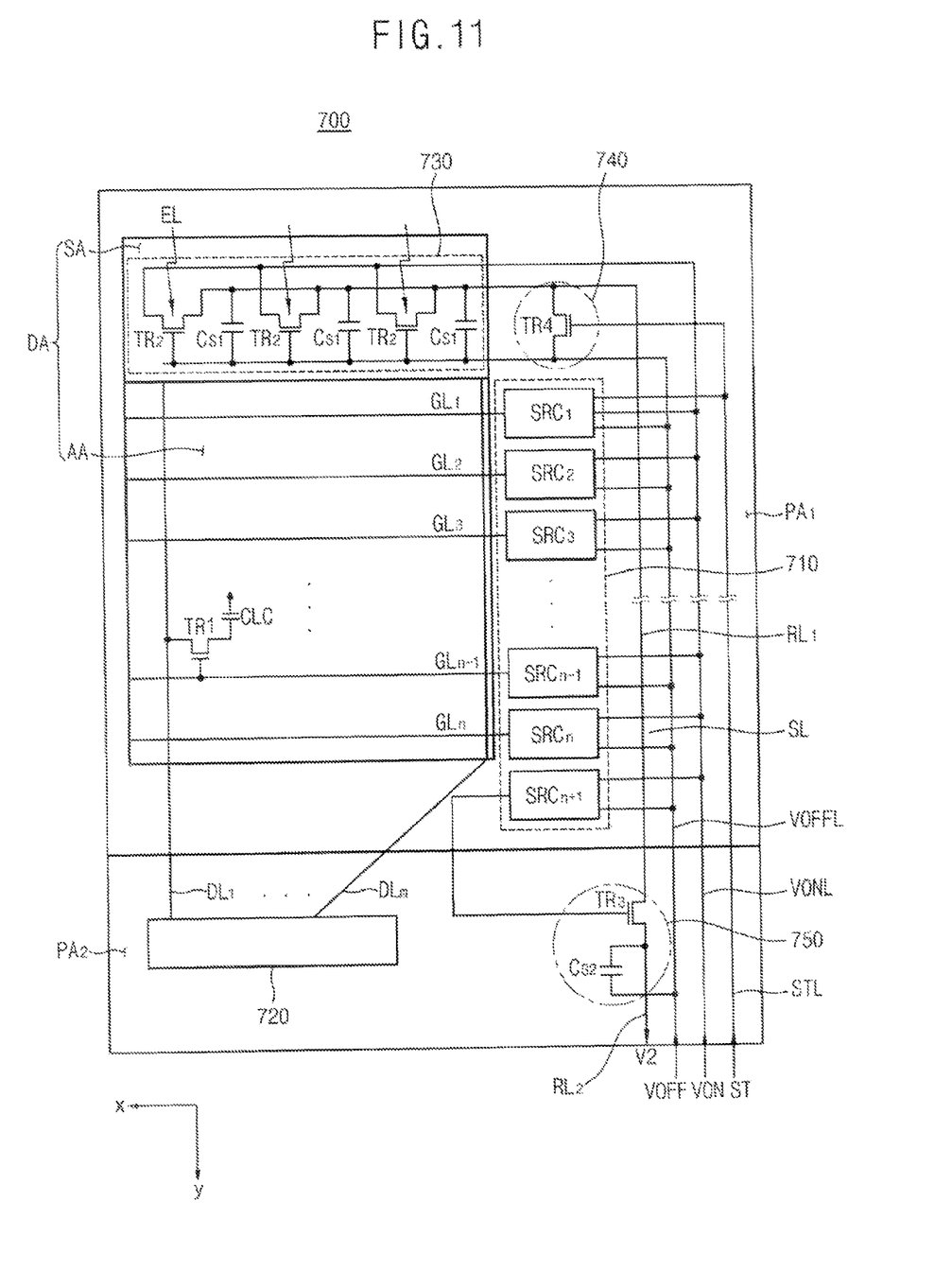
FIG. 11 is a schematic figure illustrating a display device according to another exemplary embodiment of the present invention.

FIG. 11 is a schematic plan view illustrating a display device according to an exemplary embodiment of the present invention.

Referring to FIG. 11, a liquid crystal display panel 700 includes a display area DA for displaying images and first and second peripheral areas PA1 and PA2 adjacent to the display area DA. The display area DA includes an active area AA for displaying images and a light sensing area SA for sensing an intensity of external light EL.

In the active area AA, switching elements TR1 are coupled to gate lines GL1 through GLn and data lines DL1 through DLm. In the light sensing area SA, a light sensor 730 including a photo switching element TR2 for outputting a first voltage V1 (see FIG. 11) responsive to the intensity of the external light EL and a reset unit 740 for resetting the light sensor 730 are disposed.

A gate driver circuit 710 for outputting gate signals to the gate lines GL1 through GLn is disposed in the first peripheral area PA1. The gate driver circuit 710 may be implemented as a shift register including stages SRC1 through SRCn+1 that are sequentially connected to one another. The stages SRC through SRCn+1 of the shift register output gate signals to corresponding gate lines GL1 through GLn. The last stage SRCn+1 is a first dummy stage for driving an n-th stage SRCn.

In addition, a first driving voltage interconnection VONL to which a first driving voltage VON is applied and a second driving voltage interconnection VOFFL to which a second driving voltage VOFF is applied are formed near the gate driver circuit 710 in the first peripheral area PA1. Further, a scan start interconnection STL for providing a start signal ST to the first stage SRC1 is formed near the first driving voltage interconnection VONL in the first peripheral area PA1.

A data driver circuit 720 for outputting data signals to the data lines DL1 through DLm is disposed in the second peripheral area PA2. Additionally, a read out unit 750 is disposed in the second peripheral area PA2 to convert the first voltage V1 from the light sensor 730 into a second voltage V2.

Figure 12:
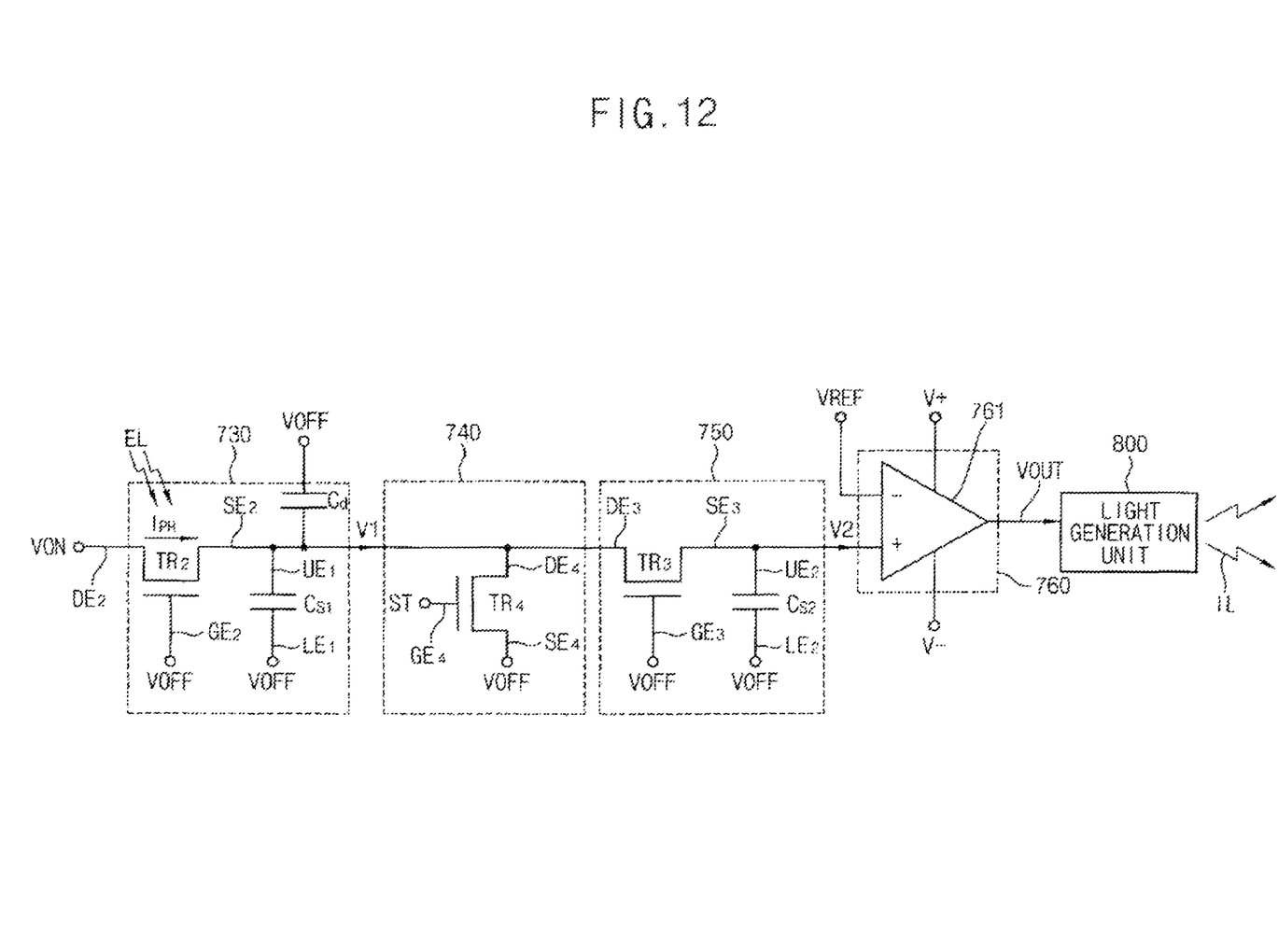
FIG. 12 is a circuit diagram illustrating an operation of a photo sensor in FIG. 11.

FIG. 12 is a circuit diagram illustrating an operation of the photo sensor illustrated in FIG. 11.

Referring to FIGS. 11 and 12, the liquid crystal display device 700 includes light sensor 730, a reset unit 740, a read out unit 750, a driving controller 760 and a light generation unit 800.

The light sensor 730 includes the photo switching element TR2 and a first storage capacitor CS1. The photo switching element TR2 has a drain electrode DE2 electrically coupled to the first driving voltage interconnection VONL to receive the first driving voltage VON, a source electrode SE2 electrically coupled to the first storage capacitor CS1 and a gate electrode GE2 electrically coupled to the second driving voltage interconnection VOFFL to receive the second driving voltage VOFF.

The first storage capacitor CS1 includes a first electrode LE1 electrically coupled to the second driving voltage interconnection VOFFL and a second electrode UE1 coupled to a first read out interconnection RL1, wherein the first and second electrodes LE1 and UE1 are opposite to each other and include an interposing gate insulation layer therebetween. The first storage capacitor CS1 is charged with the first voltage V1 corresponding to a light current IPH outputted from the photo switching element TR2. The light sensor 730 further includes a drain capacitor electrically coupled between the source electrode SE2 of the photo switching element TR2 and the second driving voltage interconnection VOFFL.

The first read out interconnection RL1 is coupled to the first storage capacitor CS1 and the first voltage V1 charged in the first storage capacitor CS1 is read out through the first read out interconnection RL1.

The read out unit 750 includes a read out switching element TR3 and a second storage capacitor CS2. The read out switching element TR3 has a gate electrode GE3, a drain electrode DE3 electrically coupled to the first read out interconnection RL1 and a source electrode SE3 electrically coupled to the second storage capacitor CS2. When the read out switching element TR3 is turned on in response to the read out signal, the first voltage V1 provided from the first read out interconnection RL1 is transmitted to the read out switching element TR3 and converted into the second voltage V2.

The second storage capacitor CS2 includes a first electrode LE2 coupled to the second driving voltage interconnection VOFFL and a second electrode UE2 coupled to a second read out interconnection RL2, wherein the first and second electrodes LE2 and UE2 are opposite to each other and include an interposing gate insulation layer therebetween. The second storage capacitor CS2 is charged with the second voltage V2 that is provided through the read out switching element TR3.

The reset unit 740 initiates the light sensor unit 730 at predetermined periods of time. The reset unit 740 includes a reset switching element TR4 having a gate electrode GE4 for receiving the reset signal ST, a drain electrode DE4 electrically coupled to the first read out interconnection RL1 and a source electrode SE4 coupled to the second driving voltage interconnection VOFFL to receive the second driving voltage VOFF.

The reset switching element TR4 discharges the first storage capacitor CS1 to the second driving voltage VOFF through the second driving voltage interconnection VOFFL in response to the reset signal ST. Therefore, the reset switching element TR4 may periodically initiate or discharge the first storage capacitor CS1.

The driving controller 760 includes an operational amplifier (hereinafter, referred to as a comparator) 761 that is electrically coupled to the read out unit 750. The comparator 761 compares a predefined reference voltage VREF with the second voltage V2 outputted from the second read out interconnection RL2. The comparator 761 outputs a first control voltage V+ or a second control voltage V− in response to a comparison between the reference voltage VREF and the second voltage V2.

The light generation unit 800 is responsive to an output voltage VOUT of the driving controller 760. For example, in response to the output voltage VOUT being the first control voltage V+, the light generation unit 800 prevents emission of an internal light IL. Additionally, in response to the output voltage VOUT being the second control voltage V−, the light generation unit 800 emits the internal light IL. Therefore, the internal light IL exiting from the liquid crystal display device 700 or a level of brightness is responsive to the intensity of the external light EL to reduce power consumption.

As described above, according to exemplary embodiments of the present invention, a photo sensor suitable to a luminosity detectable by a human eye may be made by forming a photo sensor under a Green or Red color filter and by controlling the thickness of the amorphous silicon layer.

Having described exemplary embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:

1. A photo sensor comprising:
    a photo switching element disposed at a first substrate;
    a color filter layer including a red color filter, a green color filter and a blue color filter, which are disposed at a second substrate facing the first substrate; and
    a light blocking layer disposed opposite to the blue color filter,
    wherein the photo switching element overlaps only at least one of the green color filter and the red color filter.

2. The photo sensor of claim 1, wherein the photo switching element further comprises a channel comprising an amorphous silicon layer.

3. The photo sensor of claim 2, wherein the thickness of the amorphous silicon layer is 500-2000 Å.

4. The photo sensor of claim 1, wherein the photo sensor further comprises a liquid crystal layer disposed between the first substrate and the second substrate.

5. The photo sensor of claim 4, wherein the liquid crystal layer is for the normally black mode.

6. A display panel comprising:
    a color filter layer comprising a red color filter, a green color filter and a blue color filter;
    an array substrate comprising an active area and a sensing area;
    a first switching element in the active area;
    a second switching element in the sensing area corresponding to the red or green color filter; and
    a light blocking layer in the sensing area disposed opposite to the blue color filter,
    wherein the second switching elements overlap only at least one of the green color filter and the red color filter.

7. The display panel of claim 6, wherein the second switching element comprises a channel comprising an amorphous silicon layer.

8. The display panel of claim 7, wherein the thickness of the amorphous silicon layer is 500-2000 Å.

9. The display panel of claim 6, wherein the array substrate further comprises a storage capacitor applying a voltage to the second switching element.

10. The display panel of claim 6, wherein the color filter layer corresponds to the active area and is formed on an opposing substrate.

11. The display panel of claim 10, wherein the opposing substrate further comprises a transparent pattern.

12. A display device comprises:
    a first substrate comprising pixel electrodes;
    a second substrate comprising a color filter layer including a red color filter, a green color filter and a blue color filter corresponding to the pixel electrodes to display images;
    a photo sensing element disposed at the first substrate;
    a red or green color filter corresponding to the photo sensing element formed at the second substrate to sense an amount of external light;
    a driving controller configured to output a driving control signal responsive to the amount of external light sensed by the light sensing unit;
    a light generation unit configured to provide the display unit with an internal light controlled by the driving control signal; and
    a light blocking element disposed on the first substrate opposite to the blue color filter,
    wherein the photo sensing element overlaps only at least one of the green color filter and the red color filter.

13. The display device of claim 12, wherein the photo sensing element comprises a channel comprising an amorphous silicon layer.

14. The display device of claim 13, wherein the thickness of the amorphous silicon layer is 500-2000 Å.

15. The display device of claim 12, wherein the array substrate further comprises a storage capacitor applying a voltage to the photo sensing element.

16. The display device of claim 12, wherein the color filter further comprises a transparent pattern.

* * * * *